US012585329B2

(12) United States Patent
Sharma et al.

(10) Patent No.: US 12,585,329 B2
(45) Date of Patent: Mar. 24, 2026

(54) VEHICLE HEADS-UP DISPLAY SYSTEM WITH AUGMENTED REALITY AND VISION TRACKING DEVICE

(71) Applicant: GM GLOBAL TECHNOLOGY OPERATIONS LLC, Detroit, MI (US)

(72) Inventors: Manoj K. Sharma, Troy, MI (US); Akilesh Rajavenkatanarayanan, Macomb, MI (US); Joseph F. Szczerba, Grand Blanc, MI (US); Maureen E. August, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 18/637,670

(22) Filed: Apr. 17, 2024

(65) Prior Publication Data

US 2025/0328190 A1 Oct. 23, 2025

(51) Int. Cl.
| | |
|---|---|
| *G06F 3/01* | (2006.01) |
| *G06T 3/20* | (2006.01) |
| *G06T 3/40* | (2024.01) |
| *G06V 40/16* | (2022.01) |

(52) U.S. Cl.
CPC ............... *G06F 3/013* (2013.01); *G06T 3/20* (2013.01); *G06T 3/40* (2013.01); *G06V 40/172* (2022.01)

(58) Field of Classification Search
CPC ....................................................... G06F 3/013
See application file for complete search history.

(56) References Cited

U.S. PATENT DOCUMENTS

| | | | | |
|---|---|---|---|---|
| 2018/0088323 A1* | 3/2018 | Bao | ....................... | G02B 27/017 |
| 2019/0259213 A1* | 8/2019 | Yuan | ....................... | G06F 3/013 |
| 2020/0050266 A1* | 2/2020 | Yin | ....................... | G08B 21/043 |
| 2020/0319705 A1* | 10/2020 | Rohrbacher | ........ | G06F 3/04842 |
| 2022/0155860 A1* | 5/2022 | Tzvieli | ................... | G06V 10/94 |
| 2023/0120933 A1* | 4/2023 | Kim | ....................... | B60W 40/02 |
| | | | | 345/633 |
| 2023/0221798 A1* | 7/2023 | Kim | ........................ | B60N 2/14 |
| | | | | 345/156 |

(Continued)

FOREIGN PATENT DOCUMENTS

| | | |
|---|---|---|
| DE | 69912759 T2 | 9/2004 |
| DE | 102015117224 A1 | 4/2016 |
| DE | 102015104085 A1 | 9/2016 |

(Continued)

*Primary Examiner* — Bipin Gyawali
(74) *Attorney, Agent, or Firm* — Quinn IP Law

(57) ABSTRACT

A heads-up display system for a vehicle has a controller having a processor and tangible, non-transitory memory on which instructions are recorded. The controller is adapted to project virtual images on a screen in the vehicle. The virtual images are superimposed on a real-world view visible to an operator of the vehicle. At least one tracking device is configured to obtain vision data of the operator. The controller is adapted to determine a gaze category of the operator based on the vision data, including a binary determination of whether the operator is gazing at the screen. The controller is adapted to identify a vision classification of the operator. The controller is adapted to modify the virtual images projected on the screen based in part on the gaze category and the vision classification.

16 Claims, 5 Drawing Sheets

(56)                    References Cited

U.S. PATENT DOCUMENTS

| 2023/0280827 A1* | 9/2023 | Crispin | ................... G06F 3/011 |
| | | | 345/156 |
| 2024/0053608 A1* | 2/2024 | Travers | .............. G02B 27/0172 |

FOREIGN PATENT DOCUMENTS

| DE | 102016117969 A1 | 3/2018 |
| DE | 102018213820 A1 | 2/2020 |
| DE | 112023000752 T5 | 11/2024 |

\* cited by examiner

132 ⬎          ⬋ 136          ⬋ 134

130

20

158

156

150

154

152

160

120

VEHICLE HEADS-UP DISPLAY SYSTEM WITH AUGMENTED REALITY AND VISION TRACKING DEVICE

INTRODUCTION

The present disclosure relates to a heads-up display system in a vehicle. More specifically, the disclosure relates to a vehicle heads-up display system with augmented reality and a vision tracking device, and a method of operating the display system. A heads-up display system in a vehicle allows a driver to view virtual images superimposed on the real-world view through their windshield, providing them with information without having to take their eyes off the road. This virtual information is presented at a fixed focal distance away from the driver's eyes. However, some challenges exist as the operator's eyes attempt to focus on the projected virtual information simultaneously with the real-world scenery beyond the windshield, which is at a different distance. The conflicting depth information may result in visual challenges.

SUMMARY

Disclosed herein is a display system for an operator in a vehicle. The system includes a controller having a processor and tangible, non-transitory memory on which instructions are recorded. The controller is adapted to project virtual images on a screen in the vehicle. The virtual images are superimposed on a real-world view visible to the operator. At least one tracking device is operatively connected to the vehicle. The tracking device is configured to obtain vision data of the operator, the controller being adapted to receive the vision data. The controller is adapted to determine a gaze category of the operator based on the vision data, including a binary determination of whether the operator is gazing at the screen. The controller is adapted to identify a vision classification of the operator based on the vision data, the vision classification including whether the operator has binocular vision or monocular vision. The controller is adapted to modify the virtual images projected on the screen based in part on the gaze category and the vision classification.

The tracking device may include a source and a camera. The source is adapted to emit infrared light, and the camera being adapted to detect the infrared light reflected by at least one eye of the operator. Determining the vision classification includes projecting a dynamic point on the screen. The tracking device is adapted to capture respective changes in a pupil diameter of the operator as the dynamic point is moved on the screen.

The virtual images include at least one bounding box. Modifying the virtual images may include increasing a size of the at least one bounding box when the operator is not gazing at the screen. Modifying the virtual images may include shifting a position of the at least one bounding box on the screen. Modifying the virtual images may include removing one or more border lines of the at least one bounding box.

The system may include an operator feedback module for soliciting feedback from the operator regarding display preference. The operator feedback module is selectively executable by the controller. The controller is adapted to rectify the virtual images projected on the screen based in part on the feedback. Soliciting the feedback includes projecting graphics at respective predefined locations on the screen and asking the operator to grade or assess visibility of the predefined locations.

The system may include a face recognition module accessible by the controller and adapted to store face profile data associated with the operator. The vision data of the operator is linked with the face profile data such that previously acquired sets of the vision data are accessible to the controller when the operator is recognized by face recognition module.

Disclosed herein is a method of operating a heads-up display system in a vehicle having a screen and a controller with a processor and tangible, non-transitory memory. The method includes projecting virtual images on the screen, the virtual images being superimposed on a real-world view visible to the operator, via the controller. The method includes obtaining vision data of the operator, via at least one tracking device in communication with controller. The method includes determining a gaze category of the operator based on the vision data, including a binary determination of whether the operator is gazing at the screen, via the controller. The method includes identifying a vision classification of the operator based on the vision data, the vision classification including binocular vision and monocular vision, via the controller. The method includes modifying the virtual images projected on the screen based in part on the gaze category and the vision classification, via the controller.

The above features and advantages and other features and advantages of the present disclosure are readily apparent from the following detailed description of the best modes for carrying out the disclosure when taken in connection with the accompanying drawings.

DETAILED DESCRIPTION

Figure 1:
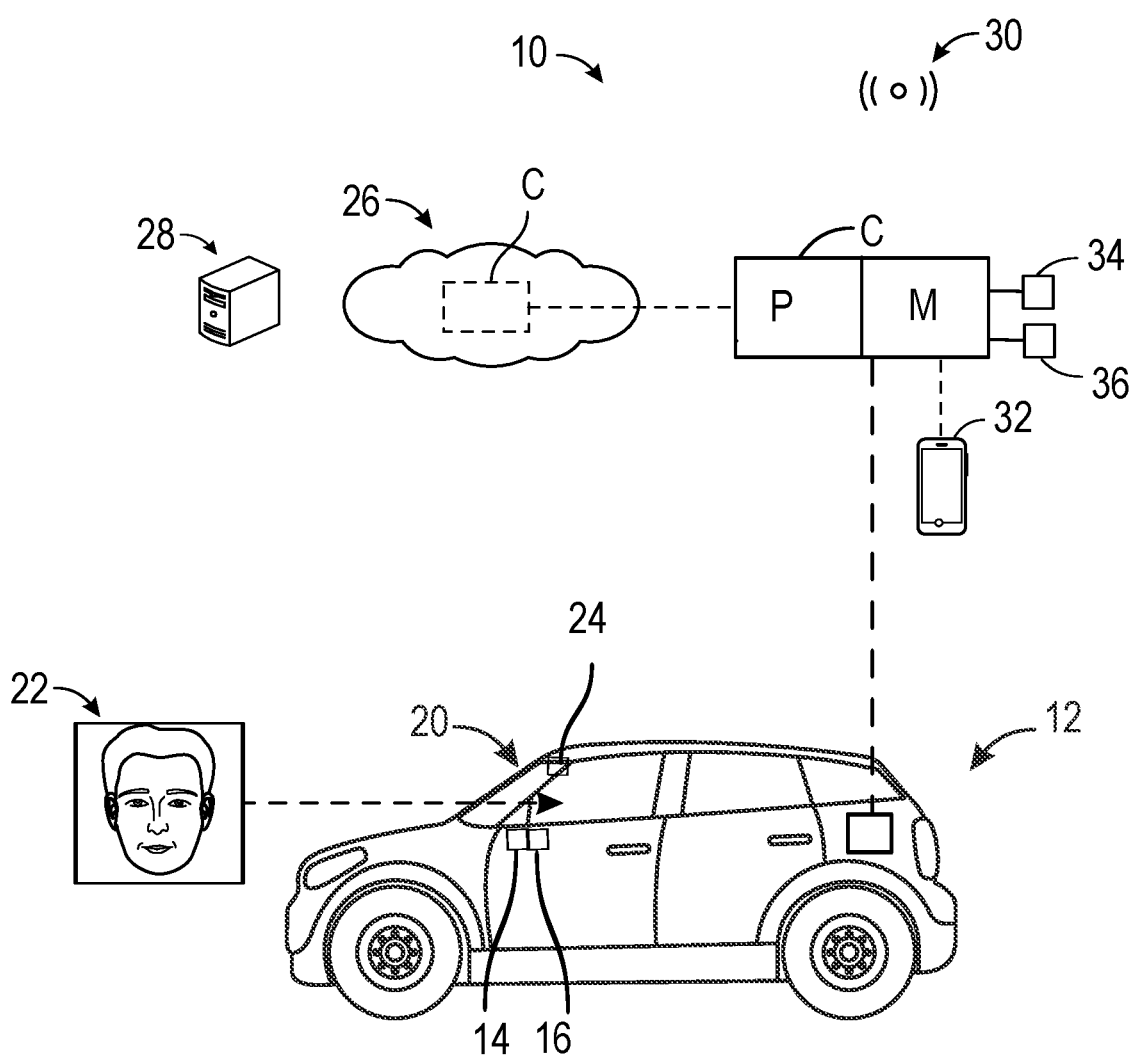
FIG. 1 is a schematic perspective view of a heads-up display system in a vehicle.

Referring to the drawings, wherein like reference numbers refer to like components, FIG. 1 schematically illustrates a heads-up display system 10 (hereinafter "system") for a vehicle 12. The vehicle 12 may be a mobile platform such as, but not limited to, a passenger car, sport utility car, light truck, heavy duty truck, ATV, minivan, bus, transit vehicle, bicycle, robot, farm implement (e.g., tractor), sports-related equipment (e.g., golf cart), boat, airplane and train. The vehicle 12 may take many different forms and include multiple and/or alternate components and facilities. It is to be understood that the vehicle 12 may take many different forms and have additional components.

Referring to FIG. 1, the system 10 includes a processing unit 14 that processes data from multiple sources, and a projection unit 16 that generates and projects the image to a surface, referred to herein as screen 20. The projection surface for the display or screen 20 is generally the windshield or front screen of the vehicle. The screen 20 is in proximity to an operator 22 and sufficiently transparent such that a real-world view is visible to the operator through the screen. Alternatively, the screen 20 may be an additional panel constructed of glass or plastic positioned between the operator 22 and the windshield on the dashboard.

In some embodiments, the projection unit 16 is placed on the dashboard of the vehicle 12 and includes a series of mirrors and lenses that reflect, refract, focus, and magnify the image for display. The projected image may travel up the screen 20 on an optical path between two planes of treated laminated glass, where it is displayed on the windshield at the appropriate eye level. The projection unit 16 may be adapted to generate the virtual images using the image-generating device and light source. The virtual images are projected onto the screen at a specific angle and position. The screen 20 reflects the projected image towards the eye of the operator 22, creating a virtual image that appears in front of or at the screen 20. In some embodiments, the projection unit 16 includes a dedicated graphical image generator for modifying the graphics for augmentation.

The human brain may have difficulty fusing the virtual information from the augmented reality display with the real-world scenery, leading to a perceptual conflict. Additionally, the virtual information on the augmented reality display may lack the full range of depth cues that the brain relies on for accurate depth perception. The system 10 is adapted to project virtual images on the screen, with the virtual images being superimposed on the real-world view visible to the operator 22, aiding drivers through challenging driving conditions.

Referring to FIG. 1, the system 10 includes a controller C having at least one processor P and at least one memory M (or non-transitory, tangible computer readable storage medium) on which instructions are recorded for executing method 100 for operating the system 10, described below with reference to FIG. 2. The controller C is adapted to track the pupil(s) of the operator 22 and modify the hybrid-graphics based on the location of the graphics, eye gaze and vision (whether binocular or monocular).

Referring to FIG. 1, the system 10 includes at least one tracking device 24 in communication with the controller C and configured to obtain vision data of the operator 22. The tracking device 24 may be employed to measure variation in pupil size and/or reactivity, e.g., light reflex of pupillary size, symmetry. The tracking device 24 may be mounted on a surface of the vehicle 12, e.g., the dashboard. The tracking device 24 may employ a visual spectrum pupillometer. As described below, the controller C is adapted to determine a gaze category of the operator 22 based on the vision data from the tracking device 24. The gaze category includes a determination of whether the operator 22 is gazing at the screen 20.

The controller C is adapted to identify a vision classification of the operator 22 based on the vision data, including a binary determination of whether binocular vision or monocular vision applies. The controller C is adapted to modify the virtual images projected on the screen based in part on the gaze category and the vision classification. The system 10 may be adapted to further rectify the augmentation based on the operator feedback using a trial-and-error method. The system 10 increases driver awareness of vehicle performance and current road events. In some embodiments, the position and/or the focus of the virtual images may be matched to the line of sight of the operator 22 to ensure optimal visibility.

In one embodiment, the controller C is embedded in the vehicle 12. In another embodiment, the controller C is stored in an "off-board" or remotely located cloud computing service 26, shown in FIG. 1. The cloud computing service 26 may include one or more remote servers 28 hosted on the Internet to store, manage, and process data. The cloud computing service 26 may be at least partially managed by personnel at various locations, such as at a "back office." Communication between the various components of the vehicle 12 and the cloud computing service 26 may occur through a wireless network 30. The wireless network 30 may be a short-range network or a long-range network.

Referring to FIG. 1, the controller C may be configured to receive and transmit data through a mobile application 32, which may be installed on a smartphone, laptop, tablet, or other electronic device and may include a touch screen interface or I/O device. The circuitry and components of a mobile application ("apps") available to those skilled in the art may be employed.

Figure 2:
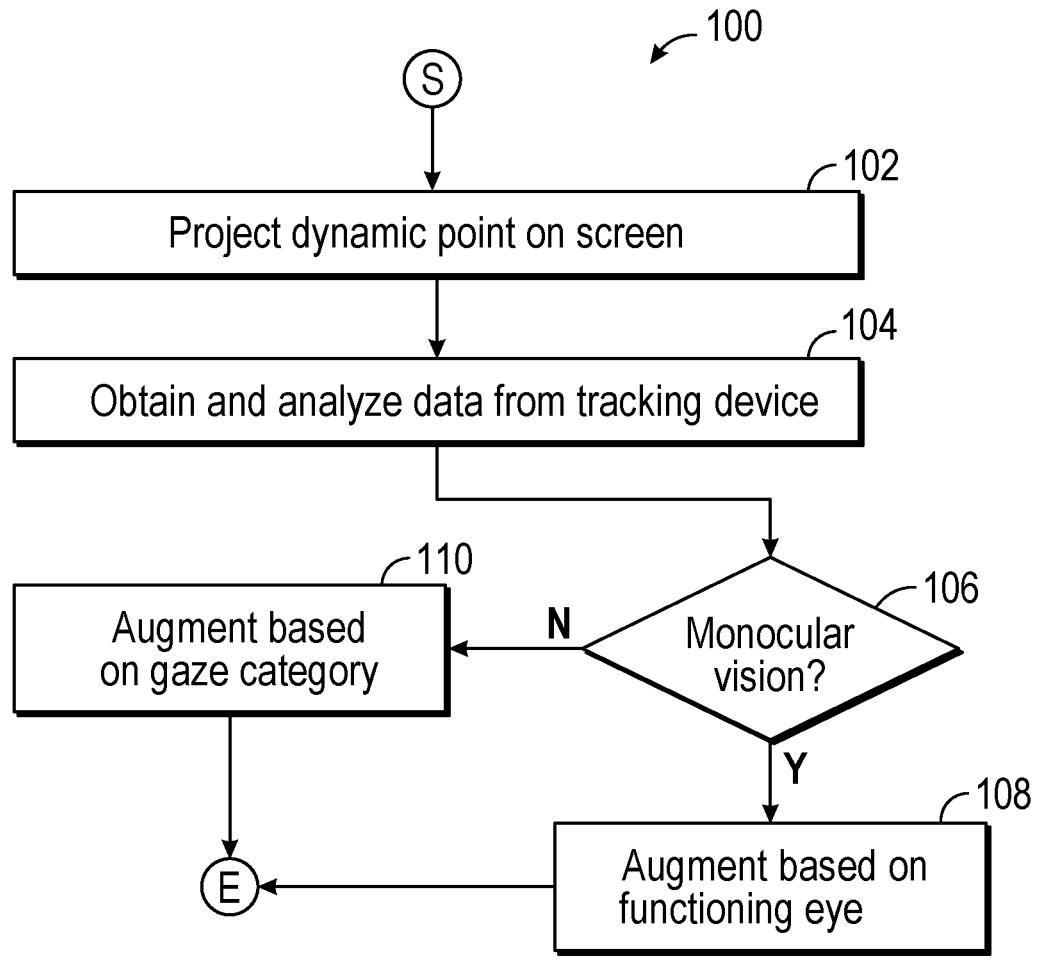
FIG. 2 is a schematic flow diagram for an example method executable by the controller of FIG. 1.

Referring now to FIG. 2, a flowchart of the method 100 stored on and executable by the controller C of FIG. 1 is shown. Method 100 may be embodied as computer-readable code or instructions stored on and partially executable by the controller C of FIG. 1. The memory M can store controller-executable instruction sets, and the processor P can execute the controller-executable instruction sets stored in the memory M. Method 100 need not be applied in the specific order recited herein. Furthermore, it is to be understood that some steps may be eliminated.

Figures 3, 4:
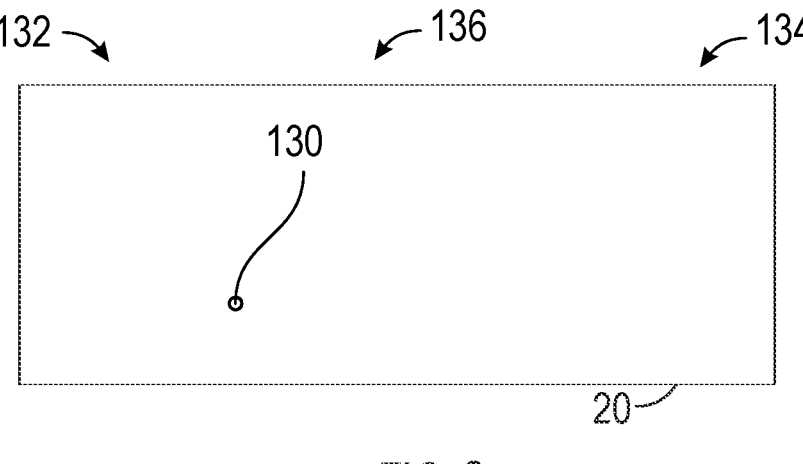
FIG. 3 is a schematic diagram of an example screen.
FIG. 4 is a schematic diagram illustrating an operator viewing an object through a screen in the vehicle of FIG. 1.

Per block 102, the method 100 includes projecting a dynamic point 130 (see FIG. 3) on the screen 20 and capturing vision data of an operator (e.g., operator 150 in FIG. 4, and operator 250 in FIGS. 5A, 5B), via the tracking device 24. FIG. 3 is a schematic diagram of an example screen 20 having a left side 132, a right side 134 and a center portion 136. The tracking device 24 is adapted to capture respective changes in a pupil diameter of the operator 22 as the dynamic point 130 is moved across the screen 20.

The method 100 proceeds to block 104, where controller C is programmed to receive and analyze the vision data captured by the tracking device 24. The controller C is adapted to obtain gaze data, which is the location that the operator 22 is looking at on the screen 20 or in the world, e.g. video recording of the eye position. From the gaze data, a gaze category of the operator is established, including a binary determination of whether or not the operator 22 is gazing at the screen 20. The operator 22 is classified as gazing at the screen 20 when the gaze location is within a negligible distance of the screen 20.

In some embodiments, the tracking device 24 includes a source adapted to emit infrared light, and a camera adapted to detect the infrared light reflected by at least one eye of the operator 22. The reflection information may be analyzed to extract eye rotation data from changes in reflections. The gaze or location that the eye is looking at may be ascertained through filtering and calculations.

In some embodiments, the tracking device 24 includes a video-based detector that tracks corneal reflection (such as the first Purkinje image and the center of the pupil) as features for tracking over time. For example, the tracking device 24 may include a dual-Purkinje eye tracker which uses reflections from the front of the cornea (referred to as the first Purkinje image) and the back of the lens (referred to as the fourth Purkinje image) as features for tracking over time. It is understood that the tracking device 24 may employ other technologies for sensors available to those skilled in the eye, the pupil diameter stays intact or the same.

Advancing to block 106, the controller C is programmed to identify a vision classification of the operator 22 based on the vision data, including whether the operator 22 has binocular vision or monocular vision. Monocular vision is characterized by one functioning eye and lacks the depth perception and three-dimensionality afforded by binocular vision. It is to be understood that the cutoff or threshold for determining whether an eye is sufficiently functioning may be varied based on the application at hand. FIG. 4 is a schematic diagram illustrating an operator 150 with monocular vision viewing a distant object 152 through a screen 120 (e.g., a windshield in the vehicle 12), with line of sight 154. The operator 150 in FIG. 4 has a prosthetic eye 156 and a functioning eye 158.

If the operator has monocular vision (block 106=YES), the method 100 advances to block 108, where the controller C is programmed to augment the display, including modifying the virtual images, based on the functioning eye 158 of the operator 150. Referring to FIG. 4, modifying the virtual images includes shifting the position of the bounding box 160 on the screen 120 based on the functioning eye 158. For example, if the functioning eye 158 is the right eye, the virtual images may be positioned towards the right side 134 of the screen 120 (see FIG. 3).

Figure 5A:
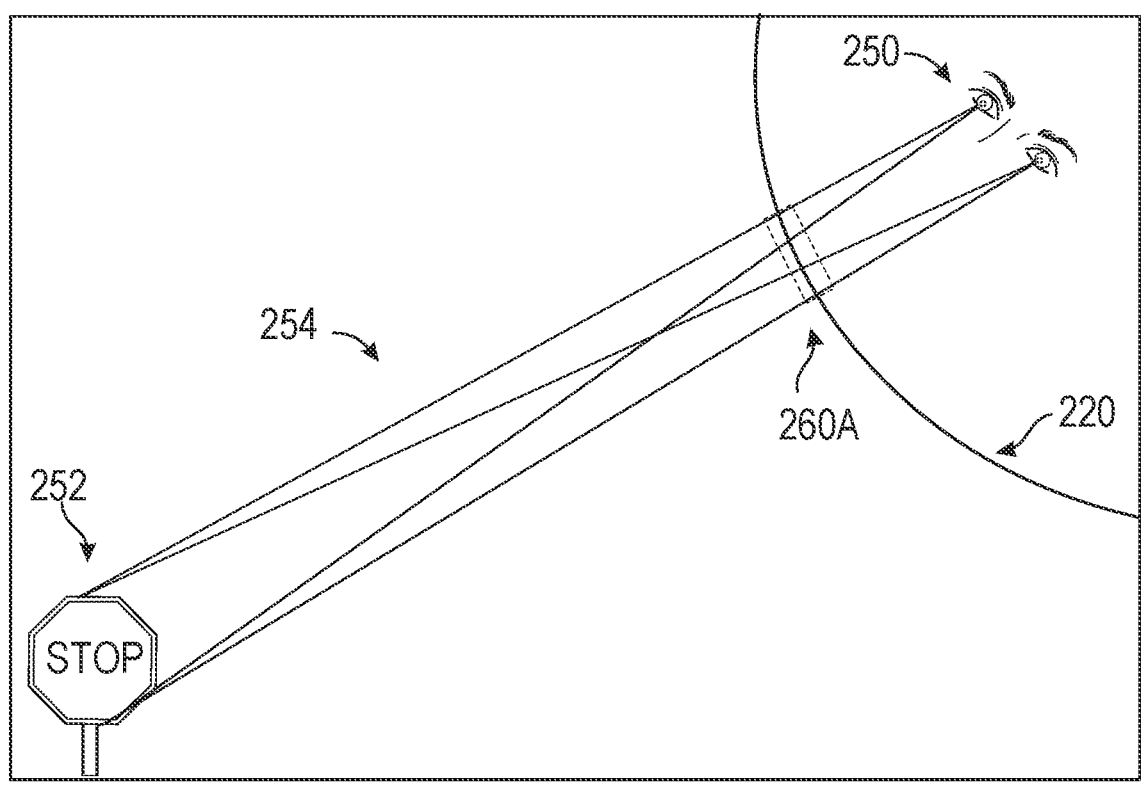
FIGS. 5A, 5B are schematic diagrams illustrating another example operator viewing an object through a front screen in the vehicle of FIG. 1, with the operator gazing at the screen in FIG. 5A and gazing at the object in FIG. 5B.
Figure 5B:
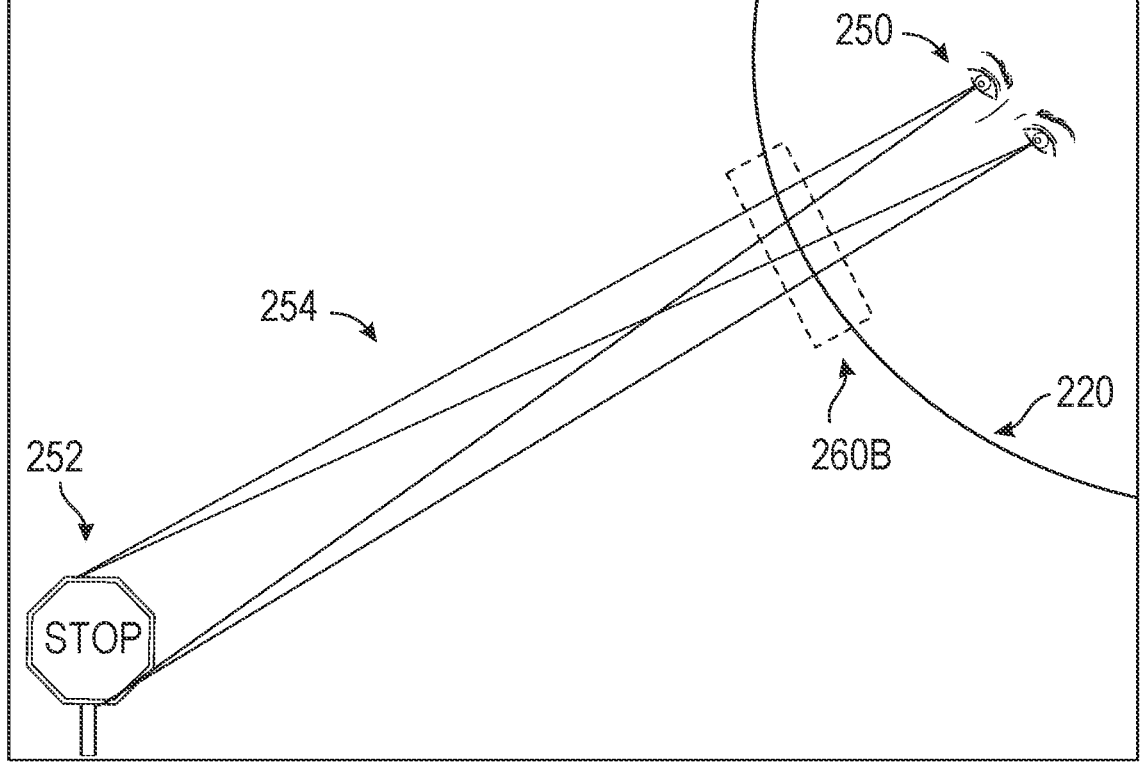

FIGS. 5A and 5B show an operator 250 with binocular vision viewing a distant object 252 through a screen 220 (e.g., a windshield in the vehicle 12), with line of sight 254. Binocular vision is the ability to perceive depth and three-dimensionality by combining the slightly different images from both eyes. Human eyes are horizontally separated, which means each eye receives a slightly different view of the horizontal field of view.

If the operator has binocular vision (block 106=NO), the method 100 advances to block 110, where the controller C is programmed to augment the display, including modifying the virtual images, based on the gaze category of the operator 22. Modifying the virtual images includes increasing a size of the bounding box when the operator 22 is not gazing at the screen 20. In FIG. 5A, the gaze of the operator 250 is at the screen 220, which has a bounding box 260A projected on it. In FIG. 5B, the gaze of the operator 250 is not at the screen 220, but instead at the object 252. The controller C is adapted to increase the size of the bounding box as the gaze of the operator 250 shifts away from the screen 220. Thus, the bounding box 260B projected on the screen 220 in FIG. 5B is larger than the bounding box 260A in FIG. 5A.

Figure 6:
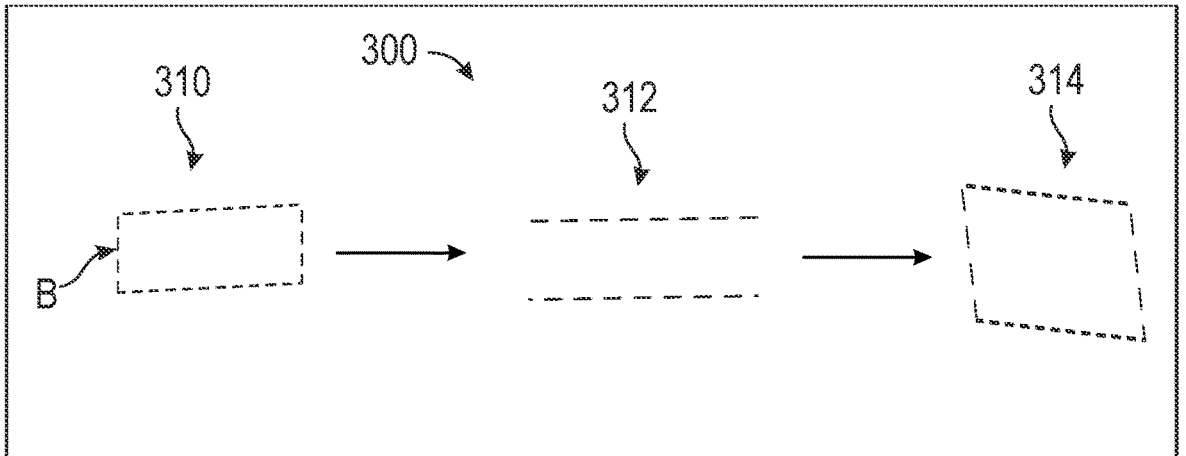
FIG. 6 is a schematic diagram illustrating various types of virtual elements employable in the system of FIG. 1.

FIG. 6 is a schematic diagram illustrating various types of virtual images 300 employable in the system 10, such as first element 310, second element 312, and third element 314. The virtual images 300 include at least one bounding box, which may be rectangular or take various shapes. The virtual images may include text and/or numbers depicting navigation instructions, and speed data. Modifying the virtual images 300 may include removing one or more border lines B of the bounding box (as shown in second element 312). The augmentation may be further modified in shape and position according to the accommodation and vision acuity of the operator 22. The controller C may be adapted to automatically pick the need of accessible augmentation using the pupillometry data from the tracking device 24. Modification may further include incorporating depth cues into the virtual information.

Referring to FIG. 1, the system 10 may include an operator feedback module 34 selectively executable by the controller C for actively soliciting feedback from the operator 22 regarding display preference. The controller C is adapted to rectify the virtual images projected on the screen 20 based in part on the feedback from the operator 22. In some embodiments, soliciting the feedback from the operator 22 includes projecting graphics at respective predefined locations on the screen 20 and asking the operator 22 to grade or assess visibility of the predefined locations. For example, if the operator 22 of FIG. 1 indicates a bias or preference towards the right side 134 of the screen 120 in FIG. 3, the virtual images may be shifted towards the right side 134. It is understood that the screen 120 may be divided into quadrants or other divisions.

Referring to FIG. 1, the system may include a face recognition module 36 accessible by the controller C and adapted to store face profile data associated with the operator 22. The vision data of the operator 22 is linked with the face profile data such that previously acquired sets of the vision data are accessible to the controller C when the operator 22 is recognized by face recognition module 36. In other words, a profile of the operator 22 may be created and linked with the face recognition module 36 to save the calibration data. This provides an advantage of not having to run the calibration each time that a specific user is driving.

In summary, the system 10 (via execution of method 100) utilizes an internal vehicle sensor, such as tracking device 24, to obtain vision data of the operator 22. The tracking device 24 may include a camera-based system, such as an infrared camera, that detects pupil expansion and contraction. The controller C is adapted to recognize the vision (monocular or binocular) and gaze of an operator 22 in the vehicle 12 to modify the full screen graphics or augmentation.

The wireless network 30 may be a communication BUS, which may be in the form of a serial Controller Area Network (CAN-BUS). The wireless network 30 may be a serial communication bus in the form of a local area network which may include, but is not limited to, a Controller Area Network (CAN), a Controller Area Network with Flexible Data Rate (CAN-FD), Ethernet, Bluetooth, WIFI and other forms of data. The wireless network 30 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, other physical media, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A heads-up display system for an operator in a vehicle having a screen, the system comprising:
   at least one tracking device configured to obtain vision data of the operator;
   a controller adapted to receive the vision data, the controller having a processor and tangible, non-transitory memory on which instructions are recorded;
   wherein the controller is adapted to project virtual images on the screen, the virtual images being superimposed on a real-world view visible to the operator, the virtual images being projected on the screen inside a bounding box;
   wherein the controller is adapted to:
      determine a gaze category of the operator based on the vision data, including a binary determination of whether the operator is gazing at the screen;
      identify a vision classification of the operator based on the vision data, the vision classification including binocular vision and monocular vision; and
      modify the virtual images projected on the screen based in part on the gaze category and the vision classification;
   wherein modifying the virtual images includes:
      when the operator is identified to have monocular vision, shifting a position of the bounding box on the screen based on a functioning eye; and
      when the operator is identified to have binocular vision and is not gazing at the screen, increasing a size of the bounding box.

2. The system of claim 1, wherein the at least one tracking device includes a source and a camera, the source being adapted to emit infrared light, and the camera being adapted to detect the infrared light reflected by at least one eye of the operator.

3. The system of claim 1, wherein determining the vision classification includes the controller commanding projection of a dynamic point on the screen, and wherein the tracking device is adapted to capture respective changes in a pupil diameter of the operator as the dynamic point is moved on the screen.

4. The system of claim 1, wherein:
   modifying the virtual images includes removing one or more border lines of the bounding box.

5. The system of claim 1, further comprising:
   a face recognition module accessible by the controller and adapted to store face profile data associated with the operator, the vision data of the operator being linked with the face profile data such that previously acquired sets of the vision data are accessible to the controller when the operator is recognized by face recognition module.

6. The system of claim 1, further comprising:
   an operator feedback module for soliciting feedback from the operator regarding display preference, the operator feedback module being selectively executable by the controller, the controller being adapted to rectify the virtual images projected on the screen based in part on the feedback.

7. The system of claim 6, wherein soliciting the feedback includes projecting graphics at respective predefined locations on the screen and asking the operator to grade or assess visibility of the predefined locations.

8. A method of operating a heads-up display system in a vehicle having a screen and a controller with a processor and tangible, non-transitory memory, the method comprising:

projecting virtual images on the screen, the virtual images being superimposed on a real-world view visible to the operator, via the controller, the virtual images being projected on the screen inside a bounding box;

obtaining vision data of the operator, via at least one tracking device in communication with controller;

determining a gaze category of the operator based on the vision data, including a binary determination of whether the operator is gazing at the screen, via the controller;

identifying a vision classification of the operator based on the vision data, the vision classification including binocular vision and monocular vision, via the controller; and modifying the virtual images projected on the screen based in part on the gaze category and the vision classification, via the controller, including:

shifting a position of the bounding box on the screen based on a functioning eye when the operator is identified to have monocular vision; and increasing a size of the bounding box when the operator is identified to have binocular vision and is not gazing at the screen.

9. The method of claim 8, further comprising:

determining the vision classification by the controller commanding projection of a dynamic point on the screen, and capturing respective changes in a pupil diameter of the operator as the dynamic point is moved on the screen, via the at least one tracking device.

10. The method of claim 8, further comprising:

modifying the virtual images by removing one or more border lines of the bounding box.

11. The method of claim 8, further comprising:

storing face profile data associated with the operator in a face recognition module accessible by the controller, and linking the vision data of the operator with the face profile data such that previously acquired sets of the vision data are accessible to the controller when the operator is recognized by face recognition module.

12. The method of claim 8, further comprising:

soliciting feedback from the operator regarding display preference through an operator feedback module selectively executable by the controller; and rectifying the virtual images projected on the screen based in part on the feedback, via the controller.

13. The method of claim 12, further comprising:

soliciting the feedback by projecting graphics at respective predefined locations on the screen and asking the operator to grade or assess visibility of the predefined locations.

14. A vehicle comprising:

a screen in proximity to an operator and sufficiently transparent such that a real-world view is visible to the operator through the screen;

a heads-up display system having a controller adapted to project virtual images on the screen, the virtual images being superimposed on the real-world view, the controller having a processor and tangible, non-transitory memory on which instructions are recorded;

at least one tracking device operatively connected to the vehicle and configured to obtain vision data of the operator, the virtual images being projected on the screen inside a bounding box;

wherein the controller is adapted to receive the vision data and:

determine a gaze category of the operator based on the vision data, including a binary determination of whether the operator is gazing at the screen;

identify a vision classification of the operator based on the vision data, the vision classification including binocular vision and monocular vision;

modify the virtual images projected on the screen based in part on the gaze category and the vision classification; and wherein modifying the virtual images includes:

when the operator is identified to have monocular vision, shifting a position of the bounding box on the screen based on a functioning eye; and when the operator is identified to have binocular vision and is not gazing at the screen, increasing a size of the bounding box.

15. The vehicle of claim 14, wherein determining the vision classification includes the controller commanding projection of a dynamic point on the screen, and wherein the tracking device is adapted to capture respective changes in a pupil diameter of the operator as the dynamic point is moved on the screen.

16. The vehicle of claim 15, wherein modifying the virtual images includes removing one or more border lines of the bounding box.

* * * * *